(12) United States Patent
Dormody et al.

(10) Patent No.: US 10,477,358 B1
(45) Date of Patent: Nov. 12, 2019

(54) SYSTEMS AND METHODS FOR DETERMINING WHETHER A MOBILE DEVICE IS INSIDE AN ENVIRONMENT EXPERIENCING ADVERSE PRESSURE VARIATION CONDITIONS

(71) Applicant: NextNav, LLC, Sunnyvale, CA (US)

(72) Inventors: Michael Dormody, San Jose, CA (US); Guiyuan Han, San Jose, CA (US); Badrinath Nagarajan, Cupertino, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 16/364,676

(22) Filed: Mar. 26, 2019

Related U.S. Application Data

(60) Provisional application No. 62/676,267, filed on May 24, 2018, provisional application No. 62/687,735, filed on Jun. 20, 2018.

(51) Int. Cl.
| | |
|---|---|
| *H04W 24/00* | (2009.01) |
| *H04W 4/029* | (2018.01) |
| *G01L 19/00* | (2006.01) |
| *G01L 27/00* | (2006.01) |
| *H04W 4/33* | (2018.01) |
| *G01C 21/20* | (2006.01) |
| *H04W 4/021* | (2018.01) |

(52) U.S. Cl.
CPC ............ *H04W 4/029* (2018.02); *G01L 19/00* (2013.01); *G01L 27/005* (2013.01); *G01C 21/206* (2013.01); *H04W 4/021* (2013.01); *H04W 4/33* (2018.02)

(58) Field of Classification Search
CPC ............ H04W 4/29; H04W 4/23; G01L 19/00
USPC ............ 455/456.1, 432.1, 436, 422.1, 414.1
See application file for complete search history.

(56) References Cited

U.S. PATENT DOCUMENTS

| | | | |
|---|---|---|---|
| 8,130,141 B2 | 3/2012 | Pattabiraman et al. | |
| 9,057,606 B2 | 6/2015 | Wolf et al. | |
| 9,980,246 B2 | 5/2018 | Pattabiraman et al. | |
| 2012/0258776 A1* | 10/2012 | Lord | G06K 9/00993 455/556.1 |
| 2014/0365488 A1* | 12/2014 | Arslan | G01S 5/0242 707/736 |

(Continued)

OTHER PUBLICATIONS

Moffat et al., "Comprehensive comparison of gap-filling techniques for eddy covariance net carbon fluxes", Agricultural and Forest Meteorology, vol. 147, Issues 3-4, Dec. 10, 2007, pp. 209-232.

(Continued)

*Primary Examiner* — Nghi H Ly
(74) *Attorney, Agent, or Firm* — Kyle Pendergrass

(57) ABSTRACT

Determining whether a mobile device is inside an environment experiencing adverse pressure variation conditions. Particular systems and methods for determining whether a mobile device is inside an environment experiencing adverse pressure variation conditions detect a change in pressure measured by a mobile device that is caused by an HVAC effect of a building or a vehicle, determine a likelihood that the mobile device is inside a building based on an estimated position of the mobile device relative to the building, and determine that the mobile device is inside the building or inside a vehicle based on the likelihood that the mobile device is inside the building.

21 Claims, 11 Drawing Sheets

During time period 3: a pressure profile outside ($P_{out,3}$) and a pressure profile in the building ($P_{bldg,3}$) are not aligned due to HVAC effect in the building.

(56) References Cited

U.S. PATENT DOCUMENTS

2016/0094950 A1\* 3/2016 Millman ............... H04W 4/026
                                                            455/456.1
2017/0280301 A1   9/2017 Chang et al.

OTHER PUBLICATIONS

Sankaran et al., "Using Mobile Phone Barometer for Low-Power Transportation Context Detection", SenSys '14 Proceedings of the 12th ACM Conference on Embedded Network Sensor Systems, Nov. 3-6, 2014, pp. 191-205.

Henn et al., "A Comparison of Methods for Filling Gaps in Hourly Near-Surface Air Temperature Data", Journal of Hydometeorology, American Meteorological Society, vol. 14, Jun. 2013, pp. 929-945.

Ghaderi et al., "Deep Forecast: Deep Learning-based Spatio-Temporal Forecasting", ICML 2017 Time Series Workshop, Sydney, Australia, 2017, 6 pages.

Germann et al., "Scale-Dependence of the Predictability of Precipitation from Continental Radar Images. Part I: Description of the Methodology", American Meteorological Society, Monthly Weather Review, vol. 130, Dec. 2002, pp. 2859-2873.

\* cited by examiner

During time period 2: a pressure profile outside ($P_{out,2}$) and a pressure profile in the car ($P_{car,2}$) are not aligned due to HVAC effect in the car.

During time period 3: a pressure profile outside ($P_{out,3}$) and a pressure profile in the building ($P_{bldg,3}$) are not aligned due to HVAC effect in the building.

SYSTEMS AND METHODS FOR DETERMINING WHETHER A MOBILE DEVICE IS INSIDE AN ENVIRONMENT EXPERIENCING ADVERSE PRESSURE VARIATION CONDITIONS

TECHNICAL FIELD

Aspects of this disclosure generally pertain to positioning of mobile devices.

BACKGROUND

Determining the exact location of a mobile device (e.g., a smart phone operated by a user) in an environment can be quite challenging, especially when the mobile device is located in an urban environment or is located within a building. Imprecise estimates of the mobile device's altitude, for example, may have life or death consequences for the user of the mobile device since the imprecise altitude estimate can delay emergency personnel response times as they search for the user on multiple floors of a building. In less dire situations, imprecise altitude estimates can lead a user to the wrong area in an environment.

Different approaches exist for estimating an altitude of a mobile device. In a barometric-based positioning system, altitude can be computed using a measurement of pressure from a calibrated pressure sensor of a mobile device along with ambient pressure measurement(s) from a network of calibrated reference pressure sensors and a measurement of ambient temperature from the network or other source. An estimate of an altitude of a mobile device ($h_{mobile}$) can be computed by the mobile device, a server, or another machine that receives needed information as follows:

$$h_{mobile} = h_{sensor} - \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device by a pressure sensor of the mobile device, $P_{sensor}$ is an estimate of pressure at the location of a reference pressure sensor that is accurate to within a tolerated amount of pressure from true pressure (e.g., less than 5 Pa), $T_{remote}$ is an estimate of temperature (e.g., in Kelvin) at the location of the reference pressure sensor or a different location of a remote temperature sensor, $h_{sensor}$ is an estimated altitude of the reference pressure sensor that is estimated to within a desired amount of altitude error (e.g., less than 1.0 meters), g corresponds to the acceleration due to gravity, R is a gas constant, and M is molar mass of air (e.g., dry air or other). The minus sign (−) may be substituted with a plus sign (+) in alternative embodiments of Equation 1, as would be understood by one of ordinary skill in the art. The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor. The reference-level pressure can be determined as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the reference pressure sensor, $P_{ref}$ is the reference-level pressure estimate, and $h_{ref}$ is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude and can be set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

In some cases, the accuracy of a computed altitude for a mobile device located in an indoor environment (e.g., a building or a vehicle) is affected by a stack/chimney effect and/or an HVAC (heating, ventilation, and air conditioning) effect of that indoor environment. The stack/chimney effect in an environment is typically characterized by an environment's leakiness, and affects a pressure profile of an environment based on a difference between temperature inside the environment and temperature outside the environment. When an HVAC effect is present in an environment, sudden and significant pushing or pulling of pressure (e.g., from a deliberate over-pressurization or under-pressurization) in the environment can occur while a similar push or pull of pressure does not occur outside the environment. As a result, an estimated altitude computed using pushed or pulled pressure values in the environment can translate to meters of measured altitude error. Knowing when an HVAC effect is present in an environment can help determine when estimated altitudes are likely to have too much error and need to be ignored or adjusted.

Different approaches for detecting if a mobile device is located in an environment in which an adverse pressure variation effect (e.g., an HVAC effect) is affecting pressure measurements are described herein. The result of these approaches—e.g., a determination as to whether the mobile device is inside a particular environment (e.g., a building or vehicle)—is highly useful in various applications, such as determining when estimated altitudes are likely to have too much error if based on measurement of pressure determined from inside the environment.

DETAILED DESCRIPTION

Different approaches for detecting if a mobile device is located in an environment in which an adverse pressure variation effect (e.g., an HVAC effect) is affecting pressure measurements are described herein. The result of these approaches—e.g., a determination as to whether the mobile device is inside a particular environment (e.g., a building or vehicle)—is highly useful in various applications that are also described herein.

Figure 4:
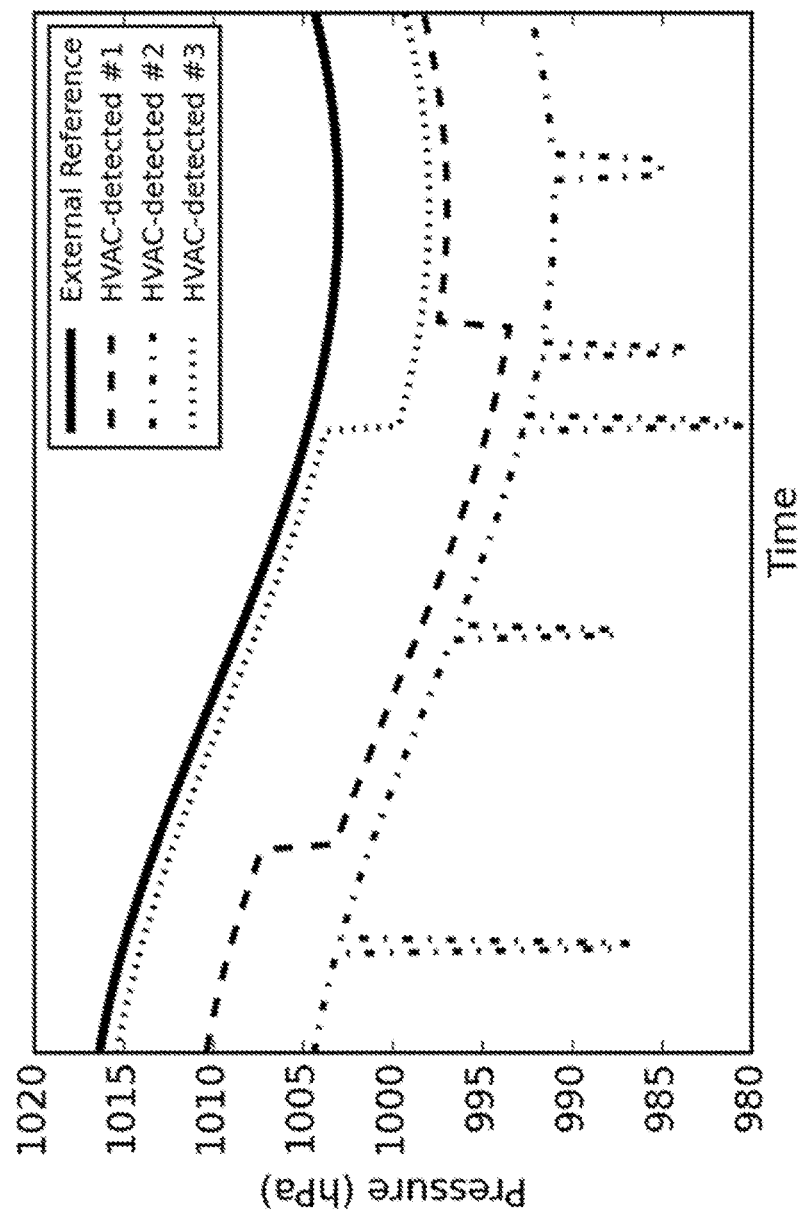
FIG. 4 illustrates pressure profiles resulting from different environments with different HVAC effects, where the pressure profiles do not align with a pressure profile of an environment with no HVAC effect.

Different environments can create an HVAC effect. One example of such an environment includes a well-sealed, climate-controlled building or a clean room. Another example is a vehicle with a fairly air-tight seal. From field data, it has been observed that the HVAC effect of an environment manifests as sudden jumps (up or down) in pressure measured by a pressure sensor inside the environment, where the sudden jumps are not reflected in outdoor pressures measured by network weather sensors. The resultant pressure values after sudden jumps can be transient by lasting only a short period of time (e.g., up to a few seconds), or sustained by lasting for long periods of time (e.g., several hours). In some cases, resultant pressure values are sustained until an operator of a mobile device with the measuring pressure sensor moves. Recorded jumps can occur at particular times of the day (e.g., when an HVAC system turns on), or when a stimulus is introduced into an environment, such as when a window or door is opened. An example of different pressure profiles is found in FIG. 4, which shows different kinds of pressure profiles showing jumps caused by an HVAC effect. As shown, one pressure profile includes transient jumps (e.g., HVAC-detected #3) and two other pressure profiles include sustained jumps (e.g., HVAC-detected #1, and HVAC-detected #2). The overall pressure contours (e.g., curves) of each of the pressure profiles may appear to be similar, but the differences in pressure between pressure profiles differ before and after jumps in a way that can introduce error into altitude computation. These differences in pressure between pressure profiles before and after jumps in one of the pressure profiles demonstrate that the pressure profiles are not "aligned" with each other.

Figure 1A:
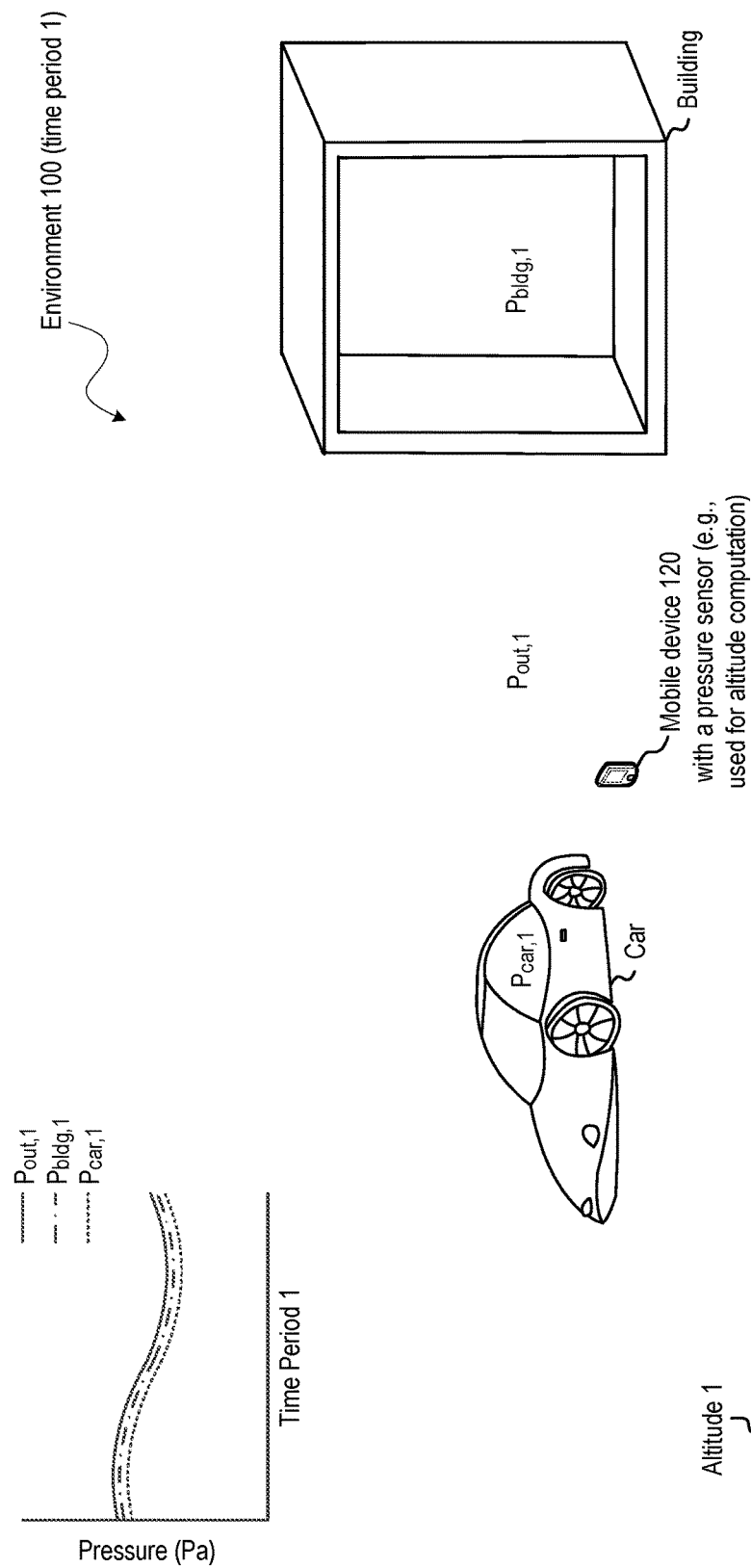
FIG. 1A illustrates pressure profiles inside a building, inside a vehicle, and outside the building and the vehicle during a first time period.
Figure 1B:
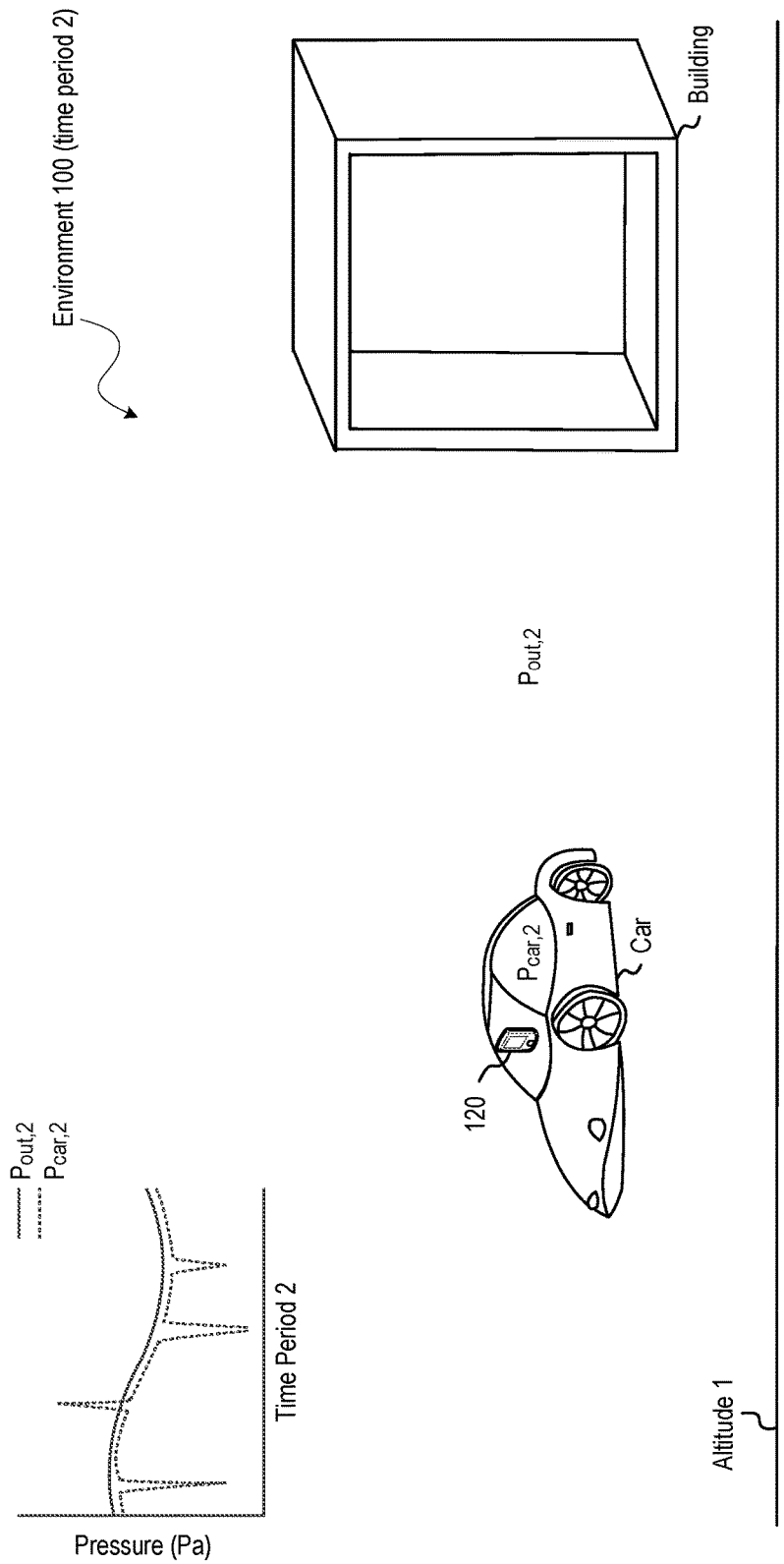
FIG. 1B illustrates pressure profiles inside a vehicle and outside the vehicle during a second time period when an HVAC effect in the vehicle results in a pressure profile inside the vehicle that is not aligned with a pressure profile of the outside during the second time period.
Figure 1C:
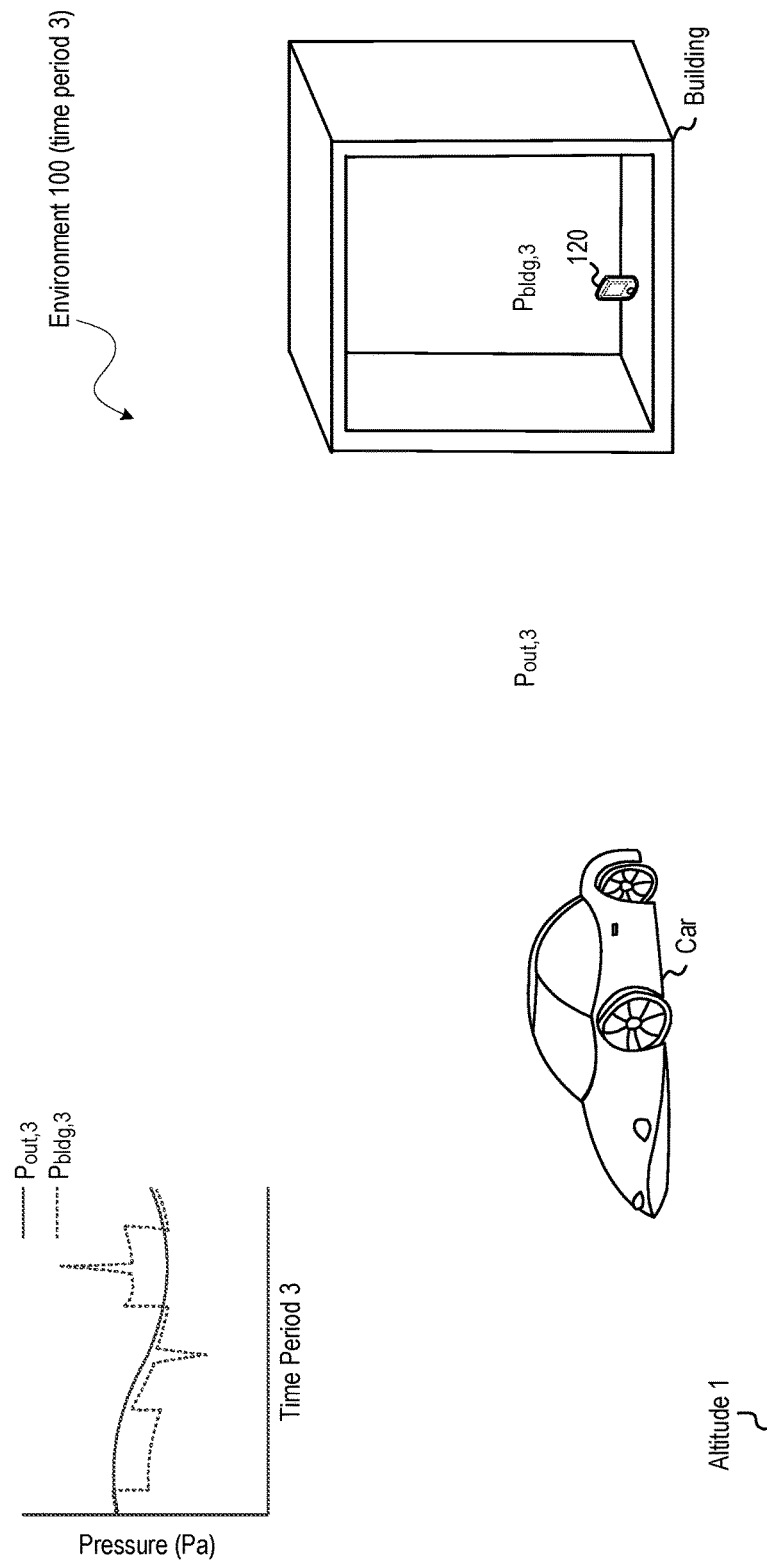
FIG. 1C illustrates pressure profiles inside a building and outside the building during a third time period when an HVAC effect in the building results in a pressure profile inside the building that is not aligned with a pressure profile of the outside during the third time period.

By way of example, FIG. 1A illustrates pressure profiles inside a building, inside a vehicle, and outside the building and the vehicle during a first time period when any HVAC effect in the building and any HVAC effect in the vehicle are minimal such that the pressure profiles during the first time period inside the building, inside the vehicle, and outside are aligned with each other. The three pressure profiles are shown as offset from each other to illustrate the same contour of each profile. However, in a situation where the pressure profiles are for a common altitude (e.g. 1 m above the ground), the three pressure profiles would align to virtually the same value. FIG. 1B illustrates possible pressure profiles inside the vehicle and outside the vehicle during a second time period when an HVAC effect in the vehicle results in a pressure profile inside the vehicle that is not aligned with the pressure profile of the outside for the entire period of time (e.g., there are jumps in the pressure profile of the vehicle without corresponding jumps in the pressure profile of the outside environment). As shown, threshold changes in pressure can be negative or positive. Alternatively, the pressure profile of the vehicle could resemble the pressure profile shown for the building in FIG. 1C (with or without the peaks). FIG. 1C illustrates pressure profiles inside the building and outside the building during a third time period when an HVAC effect in the building results in a pressure profile inside the building that is not aligned with the pressure profile of outside for the entire period of time (e.g., there are sustained jumps in the pressure profile of the building without corresponding sustained jumps in the pressure profile of the outside environment). As shown, threshold changes in pressure can be negative or positive. Alternatively, the pressure profile of the building could not have the peaks, or could resemble the pressure profile shown for the vehicle in FIG. 1B.

Knowing if a mobile device is located inside an environment affected by an HVAC effect can be helpful for many reasons. If HVAC characteristics of an environment (e.g., a building) are known, then those HVAC characteristics can be used to constrain a computed position (latitude, longitude, and/or altitude) of a mobile device as follows: (i) if a mobile device is determined to be in an environment affected by an HVAC effect (e.g., jumps in pressure are measured), but a computed position of that mobile device indicates that the mobile device is outside, the computed position can be ignored or modified to reside inside a nearby building; or (ii) if a computed position of a mobile device is determined to be inside a building with a known HVAC effect, but no such HVAC effect is detected by the mobile device, then the computed position can be ignored or modified to be outside the building.

Monitoring an HVAC effect is also useful for concluding whether a mobile device is located inside or outside an environment (e.g., a building) affected by an HVAC effect. Once a conclusion is made that a mobile device is inside or outside an environment, further actions can be taken—e.g., a determination can be made that a pressure sensor of the mobile device cannot be calibrated using pressure data during detected jumps or while the HVAC effect is present; e.g., a determination can be made that position computations need to be adjusted to account for the HVAC effect or other effects inside the environment; e.g., a map of the environment can be accessed and used for navigation or presenting other information to a user of the mobile device; and e.g., estimated altitudes are constrained to known minimum and/or maximum altitudes of the indoor environment or outdoor terrain depending on whether the mobile device is located within an indoor environment or on outdoor terrain.

Detecting an HVAC effect can also be used with other information to support certain conclusions. For example, if an HVAC effect is detected, and if the mobile device is moving at a speed or acceleration that is only possible in a vehicle, a conclusion can be made that the mobile device is in a vehicle.

The detection of a mobile device in an environment affected by an HVAC effect can also activate an application that collects pressure measurements for later use in characterizing the HVAC characteristics of the environment. For example, any recorded jumps can be time-stamped and associated with a location inside an environment (e.g., a floor or a room of a building, or a section or location of a vehicle) and then stored as data depicting an HVAC effect of the environment at particular times. Over a variety of different times and days, the HVAC characteristics of the environment can be mapped. Any mapped HVAC characteristics can be used to adjust measured pressures in order to account for any detected HVAC effect of the environment.

Similarly, the detection of a mobile device in an environment affected by an HVAC effect can also activate an application that collects data used to measure the energy efficiency of an HVAC system in a LEED certified building. In some cases, the strength of a detected HVAC effect can correlate to a size of the HVAC system of an environment. Knowledge of the size can be used to determine an actual building in which a user is located, or a make and model of a vehicle in which a user is riding.

Having described the benefits of knowing when an HVAC effect is affecting pressure measured by a mobile device of a user, attention is now turned to different approaches for detecting an HVAC effect, and then using knowledge of any detected HVAC effect to determine the type of environment in which the user is most-likely to be located before performing further optional operations.

A first approach for detecting an HVAC effect involves detecting when users are inside an environment (e.g., a building or vehicle) that has a strong HVAC effect, and determining the type of environment. The detection involves confirming if a detected jump in measured pressure is caused by an HVAC effect or a change in altitude of a mobile device. An additional test may be performed to first confirm that the detected jump occurred without a corresponding jump in outdoor pressure. If a sudden change in pressure is due to a change in altitude of a mobile device (e.g., from an elevator), an inertial sensor of the mobile device (e.g., an accelerometer) can confirm if an altitude change occurred. If the inertial sensor detects that the mobile device has not changed altitudes, or has not changed an amount of altitude consistent with the change in pressure, then the change in pressure is assumed to be caused by an HVAC effect. If inertial information is unavailable, information about a building can be used to constrain vertical displacement of a mobile device—e.g., a query to a building database can retrieve the number of floors or height of the building, and if the building is short or only has 1 floor, it would likely indicate the user did not change floors. Since the change in pressure could be caused by the mobile device entering or exiting an environment affected by an HVAC effect, an additional evaluation must be made as to the likelihood the mobile device was inside the environment when the jump in pressure was detected. One embodiment computes an estimate of the position of the mobile device when the mobile device detected the pressure jump. A location confidence value (e.g., an amount of error in the estimated position) may also be computed. An area of possible positions of the mobile device is determined (e.g., a circle centered on the estimated position with a radius equal to the location confidence value and optionally scaled by a scale factor). The area of possible positions is compared to an area of accessible locations of a building that is within the amount of error from the estimated position of the mobile device (e.g., a building polygon). If an amount of the area of possible positions of the mobile device that overlaps the area of accessible locations of the building meets or exceeds a threshold percentage (e.g., 50% or other), then a determination is made that the mobile device is inside the building, and that the detected pressure change was caused by the building's HVAC system. If the amount of the area of possible positions of the mobile device that overlaps the area of accessible locations of the building does not meet or exceed the threshold percentage, then one of two conclusions can be made: (1) the mobile device entered a vehicle with strong HVAC effect; (2) the mobile device is outside the building (e.g., having existed an environment with strong HVAC effect). In one embodiment, the only conclusion is that the mobile device entered a vehicle with strong HVAC effect. In another embodiment, additional analysis of recorded pressure measurements can be used to determine which conclusion is correct. If an HVAC effect continues to be detected (e.g., additional jumps in pressure are detected), the first conclusion may be made—e.g., the mobile device entered a vehicle with strong HVAC effect. If any detected movement of the mobile device (e.g., via an inertial sensor or a series of estimated positions) meets or exceeds an amount of movement that is only possible in a vehicle, the first conclusion may be made—e.g., the mobile device entered a vehicle with strong HVAC effect. If no HVAC effect continues to be detected, and if any detected movement of the mobile device does not meet or exceed an amount of movement that is only possible in a vehicle, then the second conclusion may be made—e.g., the mobile device is outside.

The first approach described above may be carried out using different mobile devices or the same mobile device during different periods of time, and data characterizing an environment's HVAC system can be collected and associated with the type of environment that is detected (e.g., a particular building, a vehicle used by a user). A crowd-sourced approach where data is collected by different mobile devices can be used to characterize an environment's HVAC system. With enough users across a variety of times, a building's HVAC system could be characterized, and the characterization can be used to determine the HVAC properties of the building, such as magnitudes of HVAC push/pull, frequencies of HVAC push/pull, and durations of HVAC push/pull of the building during particular time periods. An HVAC system of a vehicle used by a user (e.g., a car, a bus, a train, or other vehicle) can also be characterized, and the characterization can be used to determine the HVAC properties of the vehicle, such as magnitudes of HVAC push/pull, frequencies of HVAC push/pull, and durations of HVAC push/pull of the vehicle during particular time periods. Data on a user's motion can also be correlated to determine a user's preference in HVAC usage.

Figure 2:
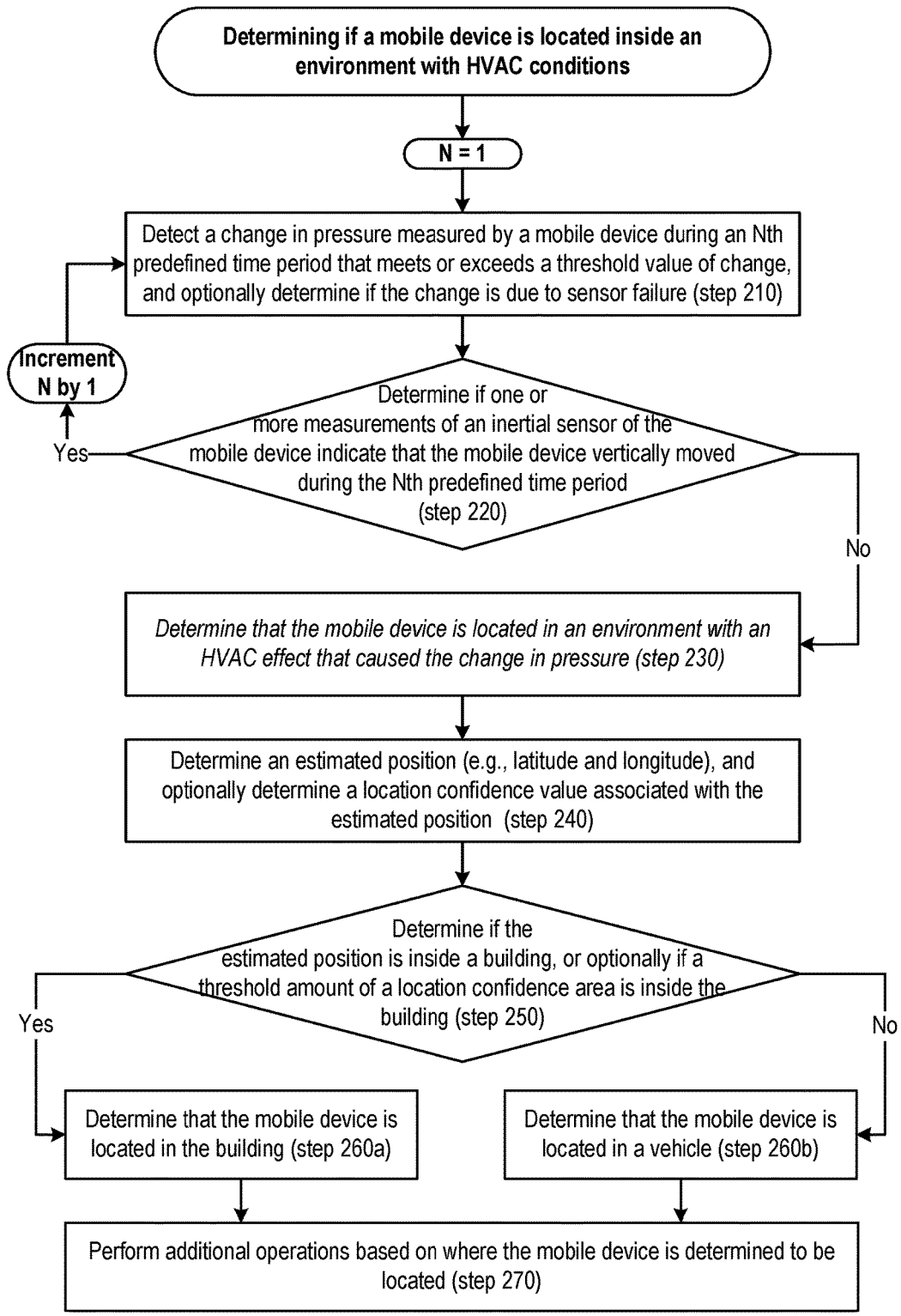
FIG. 2 depicts a process for determining whether a mobile device is inside an environment experiencing adverse pressure variation conditions.

A second approach for detecting an HVAC effect is shown in FIG. 2, which depicts a process for determining whether a mobile device is inside an environment experiencing adverse pressure variation conditions, and then determining a particular environment in which the mobile is believed to be located.

As shown in FIG. 2, a change in pressure measured by a mobile device during an Nth predefined time period that meets or exceeds a threshold value of change is detected during step 210. Different embodiments of step 210 are discussed later with reference to FIG. 3A, FIG. 3B, FIG. 3C, and FIG. 3D. The predefined time periods can be set to any length of time (e.g., 60 seconds or less, an amount of time during which two consecutive measurements of pressure are made by a pressure sensor of the mobile device, up to about 15 minutes where atmospheric pressure variation is about 10-20 Pa in change over a 15-minute period during the middle of the day). If the length of time between measurements is too long (e.g., one or more hours in some embodiments), part of a detected pressure change may be attributed to atmospheric pressure variation, not HVAC conditions. That part could be determined using outdoor pressure measurements, and then removed from analysis.

Optionally, during step 210, a determination is made as to whether the change in measured pressure is due to failure of the pressure sensor. In one embodiment of step 210 that optionally determines if the change in pressure measured by the mobile device is due to failure of the pressure sensor instead of HVAC conditions, the change in pressure is compared to a maximum threshold change in pressure that specifies an amount of pressure change that is not physically possible (e.g., a change of 100,000 Pa) in a specified period of time (e.g., a predefined number of seconds), and the change in pressure measured by the mobile device is determined to be due to sensor failure instead of HVAC conditions when the change in pressure exceeds the maximum threshold change. Alternatively, if a measurement of pressure or a series of pressure measurements are zero or not physically possible, then a determination may be made that the change in pressure measured by the mobile device is due to sensor failure instead of HVAC conditions.

During step 220, after the change in pressure is detected, a determination is made as to whether measurement(s) of inertial sensor(s) of the mobile device indicate that the mobile device vertically moved during the Nth predefined time period. If the measurement(s) of the inertial sensor(s) do not indicate the mobile device vertically moved at all or in excess of a threshold vertical movement, the process proceeds to step 230 discussed below. If the measurement(s) of the inertial sensor(s) indicate the mobile device vertically moved any distance or in excess of the threshold vertical movement, an assumption is made that the change in pressure is due to the mobile device changing altitudes during the vertical movement, and the process returns to step 210. Examples of the threshold vertical movement include an amount of acceleration (e.g., 10 m/s$^2$), an amount of speed (e.g., 2 m/s), or an amount of distance (e.g., 3 meters or more). Alternatively, during step 220, the change in measured pressure is used to determine an expected change in vertical distance, which is compared to an estimated amount of vertical movement indicated by the measurement(s) of the inertial sensor(s). The process returns to step 210 if the expected change in vertical distance is within a threshold amount of distance from estimated amount of vertical movement. Otherwise, the process advances to step 230. Examples of inertial sensors include accelerometers or other suitable sensors. If inertial information is unavailable, information about a building can be used to constrain vertical displacement of a mobile device—e.g., a query to a building database can retrieve the number of floors or height of the building, and if the building is short or only has 1 floor, it would likely indicate the user did not change floors.

During step 230, a determination is made that the mobile device is located in an environment with an HVAC effect that caused the change in pressure.

During step 240, an estimated position (e.g., latitude and longitude) is determined. Optionally, a location confidence value associated with the estimated position is determined. By way of example, the location confidence value may be defined as the expected error in an estimated position, which may be based upon individual errors feeding into the process used for determining the estimated position. For instance, the location confidence value is small for an estimated position determined using three or more distributed GNSS signals received by a mobile device with unobstructed views of the GNSS satellites from which the signals were received (i.e., the estimated position is considered to be highly-accurate). Alternatively, the location confidence value is larger for an estimated position determined using a GNSS signal received by a mobile device with an obstructed view of the GNSS satellite from which the signal was received (i.e., the estimated position is considered to have error due to that signal).

In different embodiments of step 240, the estimated position is determined using known techniques of a GNSS network, a terrestrial transmitter network, a WiFi network, or other known approaches.

In one embodiment of step 240, latitude and longitude are estimated at a point in time when the change in pressure is detected. Since the change in pressure is assumed to be caused by an HVAC effect of a building or vehicle, the estimated latitude and longitude determined at the time the change is detected serves to confirm that assumption. Estimated latitude and longitude determined before the change in pressure is detected can be used to further confirm an assumption that the detected change in pressure is caused by an HVAC effect of a building. For example, if a location confidence area based on an estimated latitude and longitude determined before the change in pressure is detected overlaps M % of a building, and another location confidence area based on an estimated latitude and longitude determined after the change in pressure is detected overlaps N % of the building, where N % is greater than M %, then it is highly likely the mobile device entered the building. In some embodiments, it is highly likely the mobile device entered the building only when N is much greater than M—e.g., when the difference in overlap between N % and M % exceeds a threshold percentage like 50%. Other I/O/D techniques known in the art that could be used in place of or with this outlined technique of using the overlap of a building (e.g. GNSS signal strength, etc.).

During step 250, a determination is made as to whether the estimated position is inside a building (or within a threshold amount of distance error from the building), or if a threshold amount of a location confidence area is inside the building. Examples of the threshold amount include 30%, 50%, 70% or more.

One example of a location confidence area includes a circular area centered at the estimated position with a radius equal to the location confidence value, or equal to the location confidence value multiplied by a scale factor. The location confidence area may alternatively have different shapes other than a circle, including a square with location confidence equal to half the side of the square. Other shapes are possible, including (ii) any polygon, (iii) an ellipsoid, (iv) a network area in which the mobile device received a signal from the network, or (v) others. By way of example, the scale factor may be a predefined number (e.g., a number greater than 1, or a number less than 1). In one embodiment, the scale factor S is determined a priori by determining, for one or a variety of location morphologies, estimated positions of the mobile device (or a representative model device of the mobile device) and location confidence values for the estimated positions when the mobile device or model thereof is at different surveyed locations (e.g., locations with known position coordinates) in the one type or a variety of location morphologies. Examples of location morphologies include dense urban, urban, suburban, and rural morphologies. For each estimated position and corresponding location confidence value, a determination is made as to whether the estimated position is within the corresponding location confidence value from the corresponding surveyed location at which the estimated position was determined. A percentage of times when the estimated positions are within their corresponding location confidence values from their corresponding surveyed locations is determined (e.g., 60%). A desired percentage is determined (e.g., 90%). A determination is made as to whether the determined percentage of times meets or exceeds the desired percentage. If not, the scale factor is determined to be a number that, when multiplied to each of the location confidence values results in a percentage of times (e.g., >90%) when the estimated positions are within a product of their corresponding location confidence values and the scale factor from their corresponding surveyed locations that meets or exceeds the desired percentage (90%). Once the scale factor is computed for the mobile device, or for a representative model of the mobile device, the scale factor is stored for later use. In one embodiment that uses a scale factor, a single scale factor is determined a priori for the mobile device. In another embodiment that uses a scale factor, different scale factors are determined a priori for different morphologies (e.g., a first scale factor for a first type of morphology, . . . , and an nth scale factor for an nth type of morphology, for different types of morphologies like dense urban, urban, suburban, rural, or other morphologies).

If the result of step 250 is yes, the mobile device is determined to be located in the building (step 260*a*). If the result of step 250 is no, the mobile device is determined to be located in a vehicle (step 260*b*), such as a car, bus, train or other vehicle.

In one embodiment, the determination of step 250 effectively determines a level of confidence in whether the mobile device is inside a building, which permits the estimated position to be located within an amount of tolerated error from the building even if the estimated position is located outside the building. If the confidence is low (e.g., if the estimated position is not inside the building, if the estimated position is not within an amount of tolerated error from the building, or if the amount of a location confidence area overlapping the building is not more than a threshold amount), then the default determination is that the mobile device is more likely to be in a vehicle near the building than in the building. If a mobile device enters a vehicle parked next to a building, and the confidence that the mobile device is in the building is high (e.g., if the estimated position is inside the building, if the estimated position is within an amount of tolerated error from the building, or if the amount of a location confidence area overlapping the building is more than a threshold amount), a determination that the mobile device is in the building may be later modified to a determination that the mobile device was in a vehicle once additional estimated positions of the mobile device indicate the vehicle is moving away from the building, or once measurements from an inertial sensor indicate movement akin to vehicle movement. As an extreme example, if subsequent estimated positions of the mobile device or if inertial sensors of the mobile device indicate a pace of travel by the mobile device that is unlikely to be possible by a human walking, and is more likely to be caused by a moving vehicle, then the determination may be changed from the mobile device being in a building to being in a vehicle.

In one embodiment of FIG. 2, an optional step (not shown) may be performed before step 260*a* is performed. In the optional step, a determination is made if the mobile device has been moving at a speed or acceleration that is assumed to be not possible inside a building (e.g., a speed or acceleration exceeding a threshold walking speed or acceleration). If the mobile device has been moving at a speed or acceleration that is assumed to be not possible inside a building, then step 260*a* is not performed, and instead step 260*b* is performed (i.e., the determination is that the mobile device is located in a vehicle, not the building). Alternatively, this optional step may occur after step 240, but before step 250, and the result would be proceeding to step 260*b* without performing step 250 if the mobile device has been moving at a speed or acceleration that is assumed to be not possible inside a building, and otherwise performing step 250 if the mobile device has been moving at a speed or acceleration that is assumed to be possible inside a building.

In optional step 270, additional operations are performed based on where the mobile device is determined to be located. Examples of additional operations during step 270 include using knowledge of the mobile device's location as being inside a building or inside a vehicle to: (i) identify information about the building (e.g, a map of the building, predetermined HVAC characteristics) or information about the vehicle (e.g., predetermined HVAC characteristics); (ii) determine when to calibrate a pressure sensor of the mobile device (e.g., when the mobile device is not inside the building or the vehicle, or when pressure measurements by the mobile device when the mobile device is inside the building or the vehicle can be adjusted to account for HVAC effect of the building or the vehicle); (iii) determine when to measure HVAC characteristics of the building (e.g., to collect data during a time period while the mobile device is inside the building for use in modifying stored HVAC characteristics of the building, for use in determining energy efficiency of the building's HVAC system, or other purposes); (iv) determine when the mobile device is outside a building, but inside a vehicle's environment that may be causing a measurement of pressure that does not accurately reflect pressure outside of the vehicle.

Detecting a Change in Pressure Measured by a Mobile Device that Meets or Exceeds a Threshold Value of Change (Step 210)

Figure 3A:
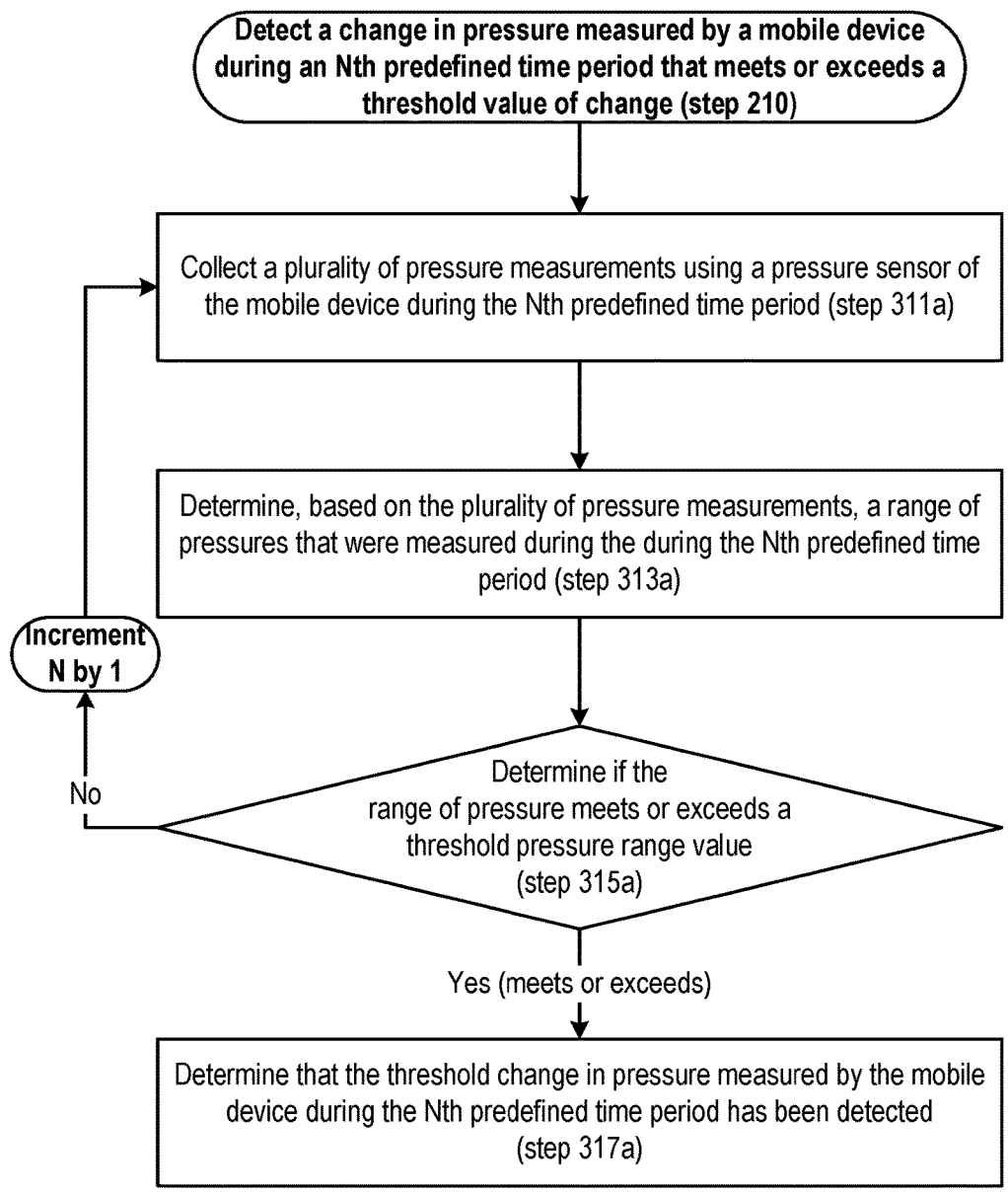
FIG. 3A depicts a first process for detecting a change in pressure measured by a mobile device that meets or exceeds a threshold value of change.

One embodiment of step 210 is shown in FIG. 3A, which includes the steps of: collecting a plurality of pressure measurements using a pressure sensor of the mobile device during the Nth predefined time period (step 311*a*); determining, based on the plurality of pressure measurements, a range of pressures that were measured during the Nth predefined time period (step 313*a*); determining if the range of pressure meets or exceeds a threshold pressure range value (step 315*a*); if the range of pressure meets or exceeds the threshold pressure range value, determining that the change in pressure measured by the mobile device during the Nth predefined time period meets or exceeds the threshold value of change (step 317*a*); and if the range of pressure does not meet or exceed the threshold pressure range value, increment N by 1, and return to step 311*a*. An example of a threshold pressure range value includes 20 Pa. One advantage of the process shown in FIG. 3A over other processes shown in other figures includes minimizing memory use and processing used for computations, where use of the process need only track and store a minimum pressure measurement and a maximum pressure measurement in addition to the timestamps of those measurements. Any new measurements need only be checked against the minimum pressure measurement and the maximum pressure measurement to determine if either should be replaced by the new measurement.

As a result, only up to three sets of measurements need to be stored at a time (e.g., the minimum, maximum and current measurements).

Figure 3B:
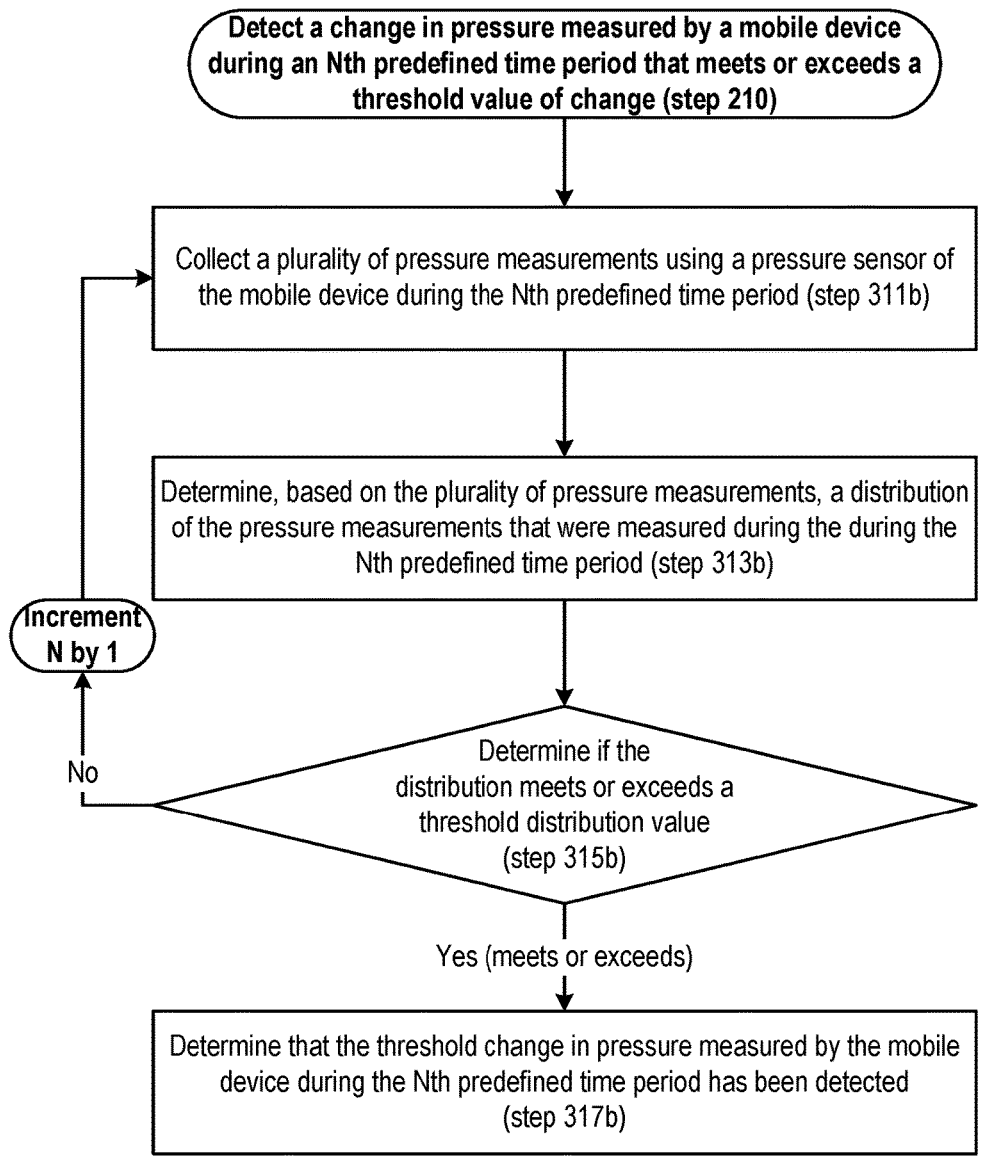
FIG. 3B depicts a second process for detecting a change in pressure measured by a mobile device that meets or exceeds a threshold value of change.

Another embodiment of step 210 is shown in FIG. 3B, which includes the steps of: collecting a plurality of pressure measurements using a pressure sensor of the mobile device during the Nth predefined time period (step 311*b*); determining, based on the plurality of pressure measurements, a distribution (e.g., standard deviation) of the pressure measurements that were measured during the Nth predefined time period (e.g., 68%, 80%, 90%, or other) (step 313*b*); determining if the distribution (e.g., standard deviation) meets or exceeds a threshold standard deviation value (step 315*b*); if the distribution (e.g., standard deviation) meets or exceeds the threshold distribution (e.g., standard deviation) value, determining that the change in pressure measured by the mobile device during the Nth predefined time period meets or exceeds the threshold value of change (step 317*b*); and if the distribution (e.g., standard deviation) does not meet or exceed the threshold pressure range value, increment N by 1, and return to step 311*b*. An example of a threshold distribution (e.g., standard deviation) value includes 10 Pa. One advantage of the process shown in FIG. 3B over other processes shown in other figures includes being able to distinguish a sudden change in measured pressure from random fluctuations that could be attributed to sensor noise or atmospheric turbulence.

The process shown in FIG. 3B can be modified to use variance instead of standard deviation, where variance is the standard deviation, squared. One advantage of using variance includes simplified computation by not needing to apply a square root to the formula, since standard deviation requires once summing the differences between each value and the mean before dividing by the number of data points, which can be cumbersome for low-level firmware programming without some approximations (e.g., Taylor series).

Figure 3C:
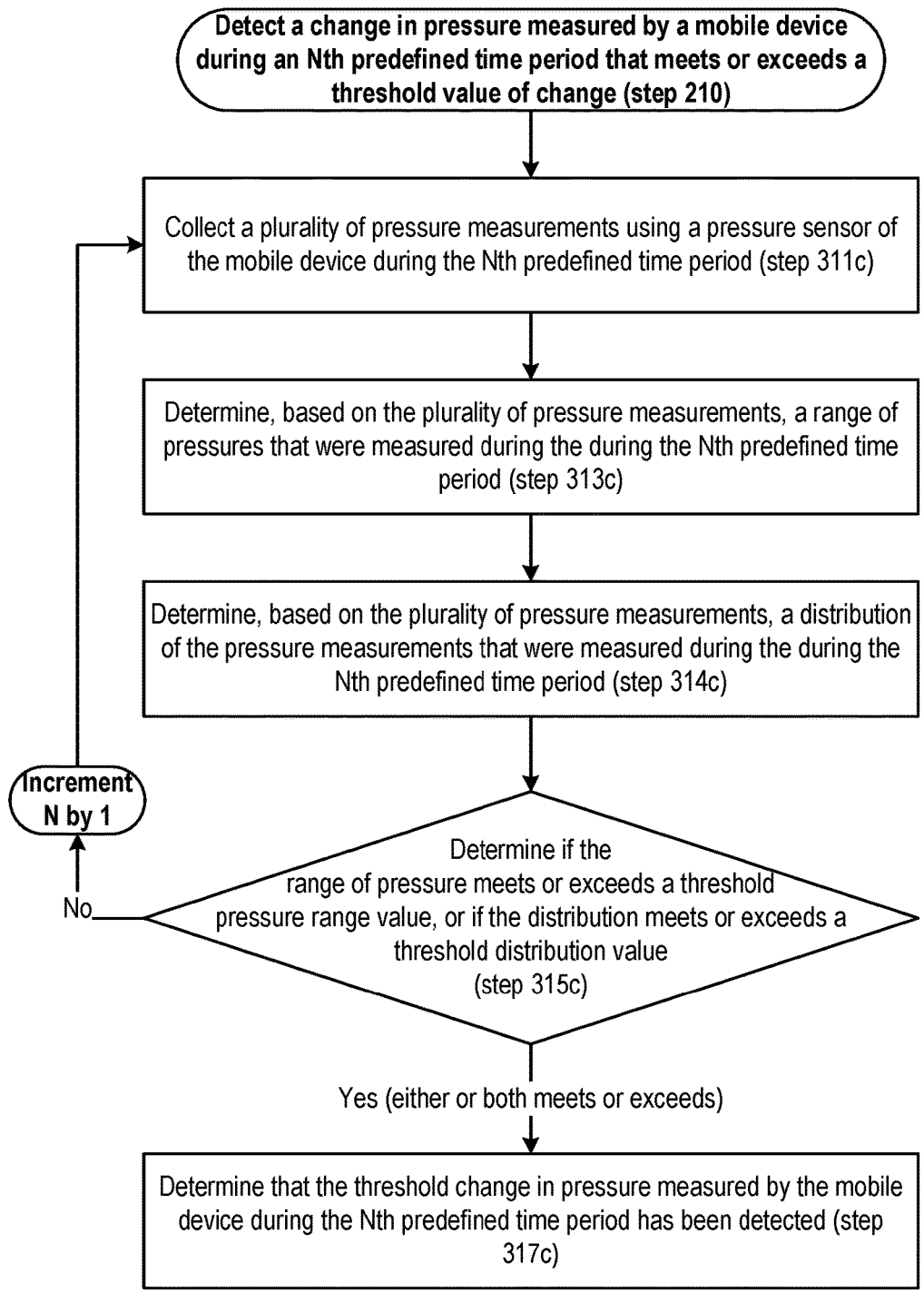
FIG. 3C depicts a third process for detecting a change in pressure measured by a mobile device that meets or exceeds a threshold value of change.

Another embodiment of step 210 is shown in FIG. 3C, which includes the steps of: collecting a plurality of pressure measurements using a pressure sensor of the mobile device during the Nth predefined time period (step 311*c*); determining, based on the plurality of pressure measurements, a range of pressures that were measured during the Nth predefined time period (step 313*c*); determining, based on the plurality of pressure measurements, a standard deviation of the pressure measurements that were measured during the Nth predefined time period (step 314*c*); determining if the range of pressure meets or exceeds a threshold pressure range value, or if the standard deviation meets or exceeds a threshold standard deviation value (step 315*c*); if the range of pressure meets or exceeds the threshold pressure range value, or if the standard deviation meets or exceeds the threshold standard deviation value, determining that the change in pressure measured by the mobile device during the Nth predefined time period meets or exceeds the threshold value of change (step 317*c*); and if both the range of pressure does not meet or exceed the threshold pressure range value and the standard deviation does not meet or exceed the threshold standard deviation value, increment N by 1, and return to step 311*c*. One advantage of the process shown in FIG. 3C over other processes shown in other figures includes having more ways of detecting a threshold change in pressure.

Figure 3D:
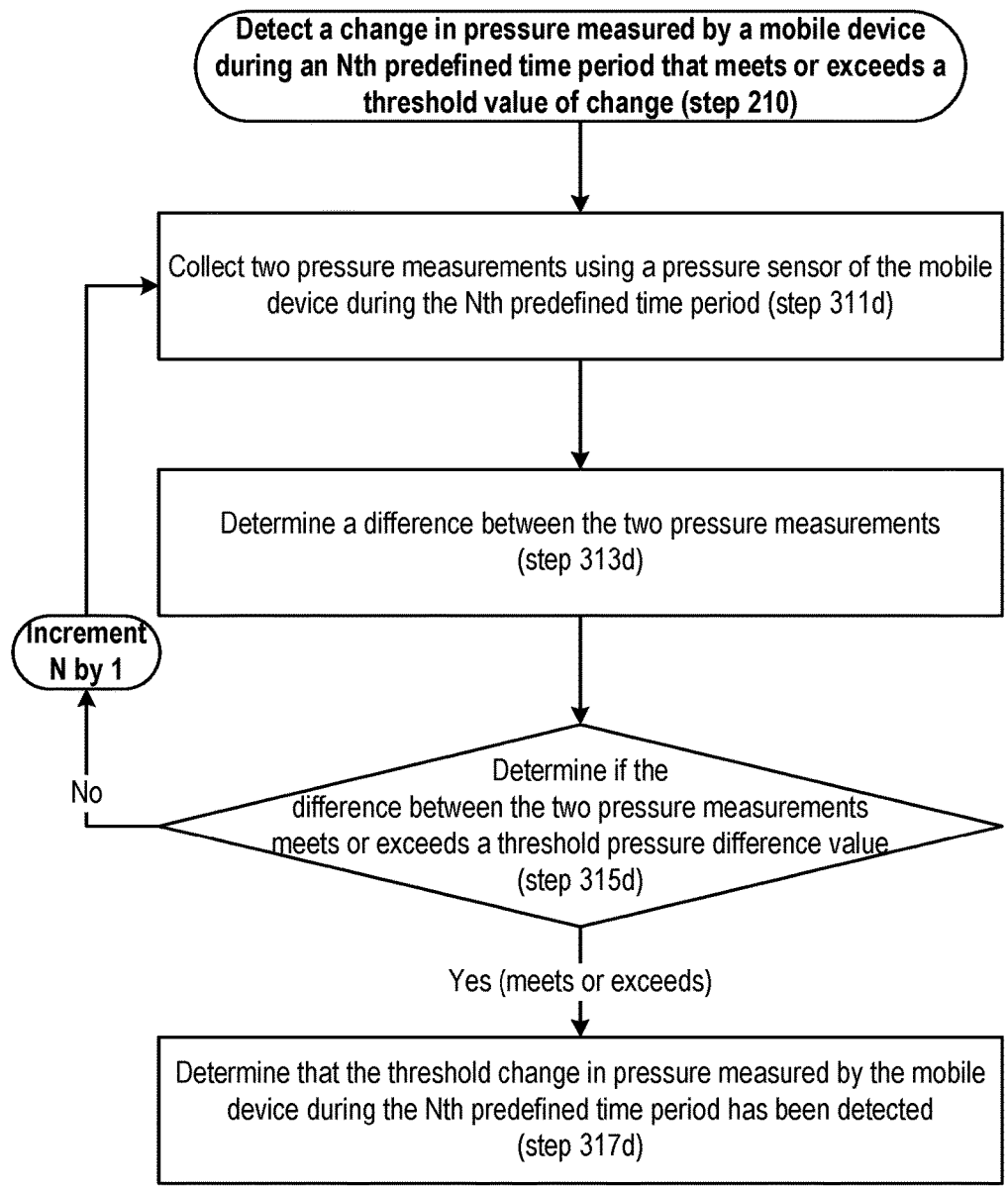
FIG. 3D depicts a fourth process for detecting a change in pressure measured by a mobile device that meets or exceeds a threshold value of change.

Yet another embodiment of step 210 is shown in FIG. 3D, which includes the steps of: collecting two pressure measurements using a pressure sensor of the mobile device during the Nth predefined time period (step 311*d*); determining a difference in pressure between the two pressure measurements (step 313*d*); determining if the difference in pressure between the two pressure measurements meets or exceeds a threshold pressure difference value (step 315*d*); if the difference in pressure meets or exceeds the threshold pressure difference value, determining that the change in pressure measured by the mobile device during the Nth predefined time period meets or exceeds the threshold value of change (step 317*d*); and if the difference in pressure does not meet or exceed the threshold pressure range value, increment N by 1, and return to step 311*d*. One advantage of the process shown in FIG. 3D over other processes shown in other figures includes reduced memory usage since only two pressure measurement values need to be stored.

By way of example, some embodiments of each of FIG. 2, FIG. 3A, FIG. 3B, FIG. 3C and FIG. 3D use a moving time window that checks for pressure changes after each new pressure measurement is added. These embodiments may also account for natural pressure variation by imposing a maximum time limit between consecutive pressure measurements that are considered in the range, standard deviation, or other tests—e.g., where only a series of two or more pressure measurements with separations between consecutive pressure measurements that all meet the requirement for the maximum time limit is considered in the range, standard deviation, or other computations. As a result, short term changes on the order of minutes are monitored.

By way of example, the processes of FIG. 2, FIG. 3A, FIG. 3B, FIG. 3C and FIG. 3D may be performed by one or more machines that include: processor(s) or other computing device(s) (e.g., at a mobile device and/or a server) for performing (e.g., that perform, or are configured, adapted or operable to perform) each step; data source(s) at which any data identified in the processes is stored for later access during the processes; and a pressure sensor of the mobile device.

Figure 5A:
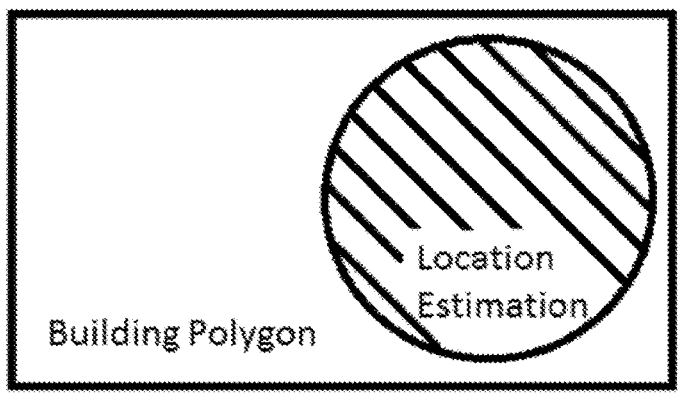
FIG. 5A and FIG. 5B illustrate an approach for determining when a mobile device is expected to be inside or outside a building.
Figure 5B:
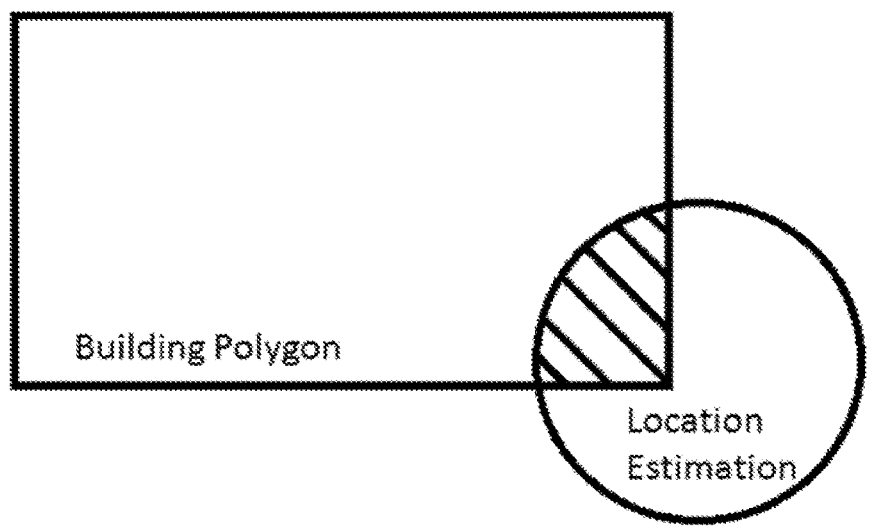

Determining when a Mobile Device is Expected to be Inside or Outside a Building FIG. 5A and FIG. 5B illustrate an approach for determining when a mobile device is expected to be inside or outside a building. As shown in FIG. 5A, a location confidence area falls entirely within a building's polygon. This illustration represents circumstances when the overlap of the polygon and the location confidence area (e.g., 100%) is above a threshold amount of overlap (e.g., 50%), and a conclusion is made that the mobile device is inside the building with high confidence. As shown in FIG. 5B, a location confidence area falls partially within the building's polygon. This illustration represents circumstances when the overlap of the polygon and the location confidence area (e.g., 30%) is below the threshold amount of overlap (e.g., 50%), and a conclusion is made that the mobile device is either (i) not inside the building or (ii) inside the building with low confidence given that the overlap of the polygon and the location confidence area is below the threshold amount of overlap.

Determining when a Mobile Device is Expected to be Inside an Environment with a Recognizable Pressure Variation Effect Approaches described herein that make determinations based on whether an HVAC effect is present in an environment can be used to make similar decisions based on whether other pressure variation effects (e.g., Venturi effect) are present, as detected from pressure profiles that are expected for the other pressure variation effects. For example, if a measured pressure profile has a particular noise profile (e.g., associated with a Venturi effect that can be generated by a moving vehicle), a determination can be made that the mobile device is in an environment where pressure measurements are unreliable (e.g., the mobile device is inside a moving vehicle).

Comparison to Other Technologies

A 2014 paper entitled *Using Mobile Phone Barometer for Low-Power Transportation Context Detection*, by Sankaran, Proceedings of the 12th ACM Conference on Embedded Network Sensor Systems, Nov. 3-6, 2014, Memphis, Tenn., illustrates a method of using a barometer to detect if a user is "still", "walking", or "driving". Depending on the spread of the sensor measurements over short times, and the measure of the terrain, it appears to assign an appropriate context mode. Sample thresholds disclosed in the paper appear to include: if the barometer changes by more than 0.8 m in 5 seconds, the user is "driving"; if the peaks and valleys of a person's height profile is more than 1 peak per 200 s, the user is "driving"; if the user has a 0.3 m standard deviation over 200 seconds, the user is flagged as "walking"; otherwise, the user is "idle". The paper also describes a barometer/accelerometer fusion technique. By contrast the approaches described in this application can be used to determine a "building pressure variation effect" (HVAC) mode and a "vehicle pressure variation effect" (e.g., HVAC, Venturi) mode that can be used to constrain and improve location data from other location services for reverse geocoding, inside/outside detection, or dead reckoning.

Technical Benefits

Processes described herein improve the fields of calibration and location determination by determining when measured pressure conditions are indicative of circumstances during which estimating an altitude of a mobile device or calibrating a pressure sensor of the mobile device will be unsuitable without compensating for the pressure conditions in the estimation process or calibration process. The processes create new and useful data, including data that confirms whether circumstances are suitable for putting an estimated altitude or pressure measurement to use during calibration of a pressure sensor or estimation of a position of a mobile device. Prior approaches that do not produce this data prior to calibration or position determination are more likely to calibrate or estimate positions with less or even unacceptable accuracy. Even under conditions where an estimated altitude is not computed when a mobile device is determined to be inside a building, the processes described herein that detect when the mobile device is inside the building advantageously provide information that has many uses (e.g., to identify a map of the building, to trigger collection of information about the building, to resolve possible locations of the mobile device to only locations that are inside a building, or another use).

Other Aspects

Any method (also referred to as a "process" or an "approach") described or otherwise enabled by disclosure herein may be implemented by hardware components (e.g., machines), software modules (e.g., stored in machine-readable media), or a combination thereof. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media (e.g. one or more non-volatile or volatile storage media, removable or non-removable media, integrated circuit media, magnetic storage media, optical storage media, or any other storage media, including RAM, ROM, and EEPROM) that may be patented under the laws of the jurisdiction in which this application is filed, but does not include machine-readable media that cannot be patented under the laws of the jurisdiction in which this application is filed. Systems that include one or more machines and one or more non-transitory machine-readable media are also contemplated herein. One or more machines that perform or implement, or are configured, operable or adapted to perform or implement operations comprising the steps of any methods described herein are also contemplated herein. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

Figure 6:
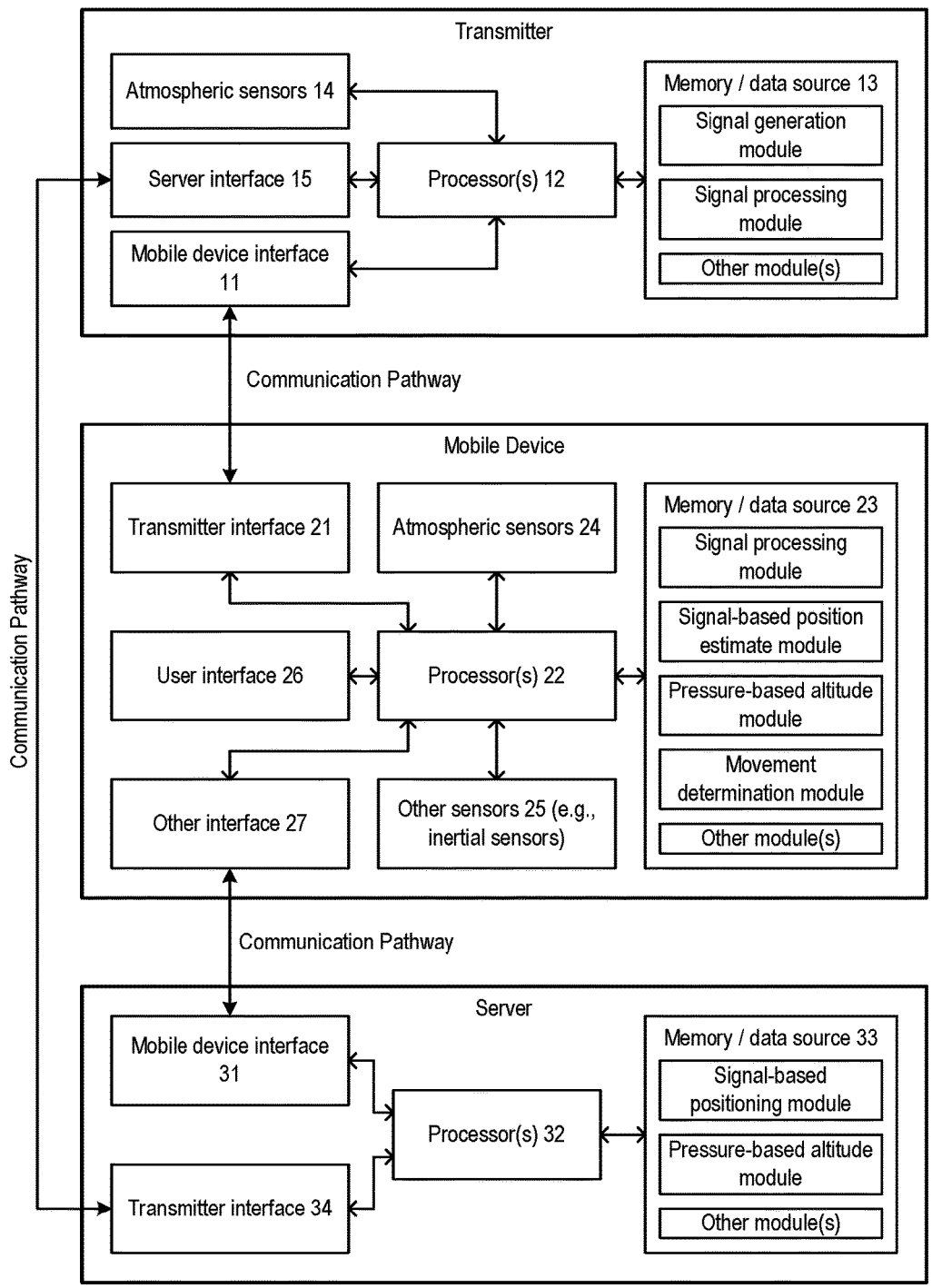
FIG. 6 illustrates components of a transmitter, a mobile device, and a server.

FIG. 6 illustrates components of a transmitter, a mobile device, and a server. Examples of communication pathways are shown by arrows between components.

By way of example in FIG. 6, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example FIG. 6, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 6, the server may include: a mobile device interface 21 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Systems and methods disclosed herein may operate within a network of terrestrial transmitters or satellites. The transmitters may be located at different altitudes or depths that are inside or outside various natural or manmade structures (e.g. buildings). Positioning signals may be sent to the mobile device from the transmitters and/or satellites using known wireless or wired transmission technologies. The transmitters may transmit the signals using one or more common multiplexing parameters—e.g. time slot, pseudorandom sequence, frequency offset, or other. The mobile device may take different forms, including a mobile phone, a tablet, a laptop, a tracking tag, a receiver, or another suitable device that can receive the positioning signals. Certain aspects disclosed herein relate to positioning modules that estimate the positions of mobile devices—e.g., where the position is represented in terms of: latitude, longitude, and/or altitude coordinates; x, y, and/or z coordinates; angular coordinates; or other representations. Positioning modules use various techniques to estimate the position of a mobile device, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Patent Application Publication No. US 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial systems, and hybrid satellite/terrestrial systems.

This application relates to the following related application(s): U.S. Pat. Appl. No. 62/676,267, filed 24 May 2018, entitled SYSTEMS AND METHODS FOR DETERMINING WHETHER A MOBILE DEVICE IS INSIDE AN ENVIRONMENT EXPERIENCING ADVERSE PRESSURE VARIATION CONDITIONS; and U.S. Pat. Appl. No. 62/687,735, filed 20 Jun. 2018 entitled SYSTEMS AND METHODS FOR DETERMINING WHETHER A MOBILE DEVICE IS INSIDE AN ENVIRONMENT EXPERIENCING ADVERSE PRESSURE VARIATION CONDITIONS. The content of each of the related application(s) is hereby incorporated by reference herein in its entirety.

The invention claimed is:

1. A method for determining whether a mobile device is inside an environment experiencing adverse pressure variation conditions, the method comprising:
   detecting a change in pressure measured by a mobile device during an Nth predefined time period that meets or exceeds a threshold value of change;
   determining if one or more measurements of an inertial sensor of the mobile device indicate that the mobile device vertically moved at least a threshold amount of distance during the Nth predefined time period;
   if the one or more measurements of an inertial sensor of the mobile device do not indicate that the mobile device vertically moved during the Nth predefined time period at least the threshold amount of distance, determining an estimated position;
   determining if the estimated position is inside a building or within a threshold amount of distance error from the building;
   if the estimated position is inside the building or within the threshold amount of distance error from the building, determining that the mobile device is located in the building; and
   if the estimated position is not inside the building or not within the threshold amount of distance error from the building, determining that the mobile device is located in a vehicle.

2. The method of claim 1, wherein detecting a change in pressure measured by a mobile device during an Nth predefined time period that meets or exceeds a threshold value of change comprises:
   collecting a plurality of pressure measurements using a pressure sensor of the mobile device during the Nth predefined time period;
   determining, based on the plurality of pressure measurements, a range of pressures that were measured during the Nth predefined time period;
   determining if the range of pressure meets or exceeds a threshold pressure range value; and
   if the range of pressure meets or exceeds the threshold pressure range value, determining that the change in pressure measured by the mobile device during the Nth predefined time period meets or exceeds the threshold value of change.

3. The method of claim 1, wherein detecting a change in pressure measured by a mobile device during an Nth predefined time period that meets or exceeds a threshold value of change comprises:
   collecting a plurality of pressure measurements using a pressure sensor of the mobile device during the Nth predefined time period;
   determining, based on the plurality of pressure measurements, a distribution of the pressure measurements that were measured during the Nth predefined time period;
   determining if the distribution meets or exceeds a threshold distribution value; and if the distribution meets or exceeds the threshold distribution value, determining that the change in pressure measured by the mobile device during the Nth predefined time period meets or exceeds the threshold value of change.

4. The method of claim 1, wherein detecting a change in pressure measured by a mobile device during an Nth predefined time period that meets or exceeds a threshold value of change comprises:
   collecting a plurality of pressure measurements using a pressure sensor of the mobile device during the Nth predefined time period;
   determining, based on the plurality of pressure measurements, a range of pressures that were measured during the Nth predefined time period;
   determining, based on the plurality of pressure measurements, a distribution of the pressure measurements that were measured during the Nth predefined time period;
   determining if the range of pressure meets or exceeds a threshold pressure range value, or if the distribution meets or exceeds a threshold distribution value; and
   if the range of pressure meets or exceeds the threshold pressure range value, or if the distribution meets or exceeds the threshold distribution value, determining that the change in pressure measured by the mobile device during the Nth predefined time period meets or exceeds the threshold value of change.

5. The method of claim 1, wherein detecting a change in pressure measured by a mobile device during an Nth predefined time period that meets or exceeds a threshold value of change comprises:
   collecting two pressure measurements using a pressure sensor of the mobile device during the Nth predefined time period;
   determining a difference between the two pressure measurements;
   determining if the difference between the two pressure measurements meets or exceeds a threshold pressure difference value; and
   if the difference between the two pressure measurements meets or exceeds the threshold pressure difference value, determining that the change in pressure measured by the mobile device during the Nth predefined time period meets or exceeds the threshold value of change.

6. The method of claim 1, wherein the method further comprises:
   using the location of the mobile device as being inside a building or inside a vehicle to perform an operation.

7. The method of claim 6, wherein the operation includes identifying information about the building or the vehicle, wherein the information specifies a map of the building, or predetermined HVAC characteristics for the building or the vehicle.

8. The method of claim 6, wherein the operation includes determining to calibrate a pressure sensor of the mobile device when the mobile device is not inside the building or the vehicle.

9. The method of claim 6, wherein the operation includes measuring HVAC characteristics of the building or the vehicle.

10. The method of claim 1, wherein the method further comprises:
   determining if the change in pressure is due to sensor failure;
   determining a location confidence value associated with the estimated position;
   determining if a threshold amount of a location confidence area is inside the building;
   if the threshold amount of the location confidence area is inside the building, determining that the mobile device is located in the building; and
   if the threshold amount of the location confidence area is not inside the building, determining that the mobile device is located in a vehicle.

11. A system for determining whether a mobile device is inside an environment experiencing adverse pressure variation conditions, the system comprising one or more machines configured to perform a method comprising:
   detecting a change in pressure measured by a mobile device during an Nth predefined time period that meets or exceeds a threshold value of change;
   determining if one or more measurements of an inertial sensor of the mobile device indicate that the mobile device vertically moved at least a threshold amount of distance during the Nth predefined time period;
   if the one or more measurements of an inertial sensor of the mobile device do not indicate that the mobile device vertically moved during the Nth predefined time period at least the threshold amount of distance, determining an estimated position;
   determining if the estimated position is inside a building or within a threshold amount of distance error from the building;
   if the estimated position is inside the building or within the threshold amount of distance error from the building, determining that the mobile device is located in the building; and
   if the estimated position is not inside the building or not within the threshold amount of distance error from the building, determining that the mobile device is located in a vehicle.

12. One or more non-transitory machine-readable media embodying program instructions that, when executed by one or more machines, cause the one or more machines to implement a method for determining whether a mobile device is inside an environment experiencing adverse pressure variation conditions, the method comprising:
   detecting a change in pressure measured by a mobile device during an Nth predefined time period that meets or exceeds a threshold value of change;
   determining if one or more measurements of an inertial sensor of the mobile device indicate that the mobile device vertically moved at least a threshold amount of distance during the Nth predefined time period;
   if the one or more measurements of an inertial sensor of the mobile device do not indicate that the mobile device vertically moved during the Nth predefined time period at least the threshold amount of distance, determining an estimated position;
   determining if the estimated position is inside a building or within a threshold amount of distance error from the building;
   if the estimated position is inside the building or within the threshold amount of distance error from the building, determining that the mobile device is located in the building; and
   if the estimated position is not inside the building or not within the threshold amount of distance error from the building, determining that the mobile device is located in a vehicle.

13. The one or more non-transitory machine-readable media of claim 12, wherein detecting a change in pressure measured by a mobile device during an Nth predefined time period that meets or exceeds a threshold value of change comprises:
   collecting a plurality of pressure measurements using a pressure sensor of the mobile device during the Nth predefined time period;
   determining, based on the plurality of pressure measurements, a range of pressures that were measured during the Nth predefined time period;
   determining if the range of pressure meets or exceeds a threshold pressure range value; and
   if the range of pressure meets or exceeds the threshold pressure range value, determining that the change in pressure measured by the mobile device during the Nth predefined time period meets or exceeds the threshold value of change.

14. The one or more non-transitory machine-readable media of claim 12, wherein detecting a change in pressure measured by a mobile device during an Nth predefined time period that meets or exceeds a threshold value of change comprises:
   collecting a plurality of pressure measurements using a pressure sensor of the mobile device during the Nth predefined time period;
   determining, based on the plurality of pressure measurements, a distribution of the pressure measurements that were measured during the Nth predefined time period;
   determining if the distribution meets or exceeds a threshold distribution value; and
   if the distribution meets or exceeds the threshold distribution value, determining that the change in pressure measured by the mobile device during the Nth predefined time period meets or exceeds the threshold value of change.

15. The one or more non-transitory machine-readable media of claim 12, wherein detecting a change in pressure measured by a mobile device during an Nth predefined time period that meets or exceeds a threshold value of change comprises:
   collecting a plurality of pressure measurements using a pressure sensor of the mobile device during the Nth predefined time period;
   determining, based on the plurality of pressure measurements, a range of pressures that were measured during the Nth predefined time period;
   determining, based on the plurality of pressure measurements, a distribution of the pressure measurements that were measured during the Nth predefined time period;
   determining if the range of pressure meets or exceeds a threshold pressure range value, or if the distribution meets or exceeds a threshold distribution value; and
   if the range of pressure meets or exceeds the threshold pressure range value, or if the distribution meets or exceeds the threshold distribution value, determining that the change in pressure measured by the mobile device during the Nth predefined time period meets or exceeds the threshold value of change.

16. The one or more non-transitory machine-readable media of claim 12, wherein detecting a change in pressure measured by a mobile device during an Nth predefined time period that meets or exceeds a threshold value of change comprises:
   collecting two pressure measurements using a pressure sensor of the mobile device during the Nth predefined time period;
   determining a difference between the two pressure measurements;
   determining if the difference between the two pressure measurements meets or exceeds a threshold pressure difference value; and
   if the difference between the two pressure measurements meets or exceeds the threshold pressure difference value, determining that the change in pressure measured by the mobile device during the Nth predefined time period meets or exceeds the threshold value of change.

17. The one or more non-transitory machine-readable media of claim 12, wherein the method further comprises:
   using the location of the mobile device as being inside a building or inside a vehicle to perform an operation.

18. The one or more non-transitory machine-readable media of claim 17, wherein the operation includes identifying information about the building or the vehicle, wherein the information specifies a map of the building, or predetermined HVAC characteristics for the building or the vehicle.

19. The one or more non-transitory machine-readable media of claim 17, wherein the operation includes determining to calibrate a pressure sensor of the mobile device when the mobile device is not inside the building or the vehicle.

20. The one or more non-transitory machine-readable media of claim 17, wherein the operation includes measuring HVAC characteristics of the building or the vehicle.

21. The one or more non-transitory machine-readable media of claim 12, wherein the method further comprises:
   determining if the change in pressure is due to sensor failure;
   determining a location confidence value associated with the estimated position;
   determining if a threshold amount of a location confidence area is inside the building;
   if the threshold amount of the location confidence area is inside the building, determining that the mobile device is located in the building; and
   if the threshold amount of the location confidence area is not inside the building, determining that the mobile device is located in a vehicle.

* * * * *